(12) United States Patent
Oniki et al.

(10) Patent No.: US 9,100,583 B2
(45) Date of Patent: Aug. 4, 2015

(54) IMAGE PROCESSING APPARATUS FOR CORRECTING AN ABERRATION OF AN IMAGE CONTAINING A LUMINANCE SATURATION PART, IMAGE PICKUP APPARATUS, IMAGE PROCESSING METHOD, AND NON-TRANSITORY RECORDING MEDIUM STORING PROGRAM

(71) Applicant: CANON KABUSHIKI KAISHA, Tokyo (JP)

(72) Inventors: Takashi Oniki, Utsunomiya (JP); Koshi Hatakeyama, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 133 days.

(21) Appl. No.: 13/766,972

(22) Filed: Feb. 14, 2013

(65) Prior Publication Data

US 2013/0215296 A1  Aug. 22, 2013

(30) Foreign Application Priority Data

Feb. 17, 2012 (JP) .................................. 2012-033422

(51) Int. Cl.
*H04N 5/235* (2006.01)
*G06T 5/20* (2006.01)
*G06T 5/50* (2006.01)
*G06T 5/00* (2006.01)
*H04N 5/217* (2011.01)

(52) U.S. Cl.
CPC .............. *H04N 5/2355* (2013.01); *G06T 5/001* (2013.01); *G06T 5/008* (2013.01); *G06T 5/20* (2013.01); *G06T 5/50* (2013.01); *H04N 5/217* (2013.01);

(Continued)

(58) Field of Classification Search
CPC ............ H04N 5/3572; H04N 5/35536; H04N 5/2355; H04N 5/35554; H04N 5/3535
USPC ........................................ 348/229.1, 241, 251
See application file for complete search history.

(56) References Cited

U.S. PATENT DOCUMENTS

| 6,452,635 B1 * | 9/2002 | Tanaka ........................... 348/342 |
| 2008/0219585 A1 * | 9/2008 | Kasai et al. .................... 382/274 |

(Continued)

FOREIGN PATENT DOCUMENTS

| JP | 05-153473 A | 6/1993 |
| JP | 2009-284009 A | 12/2009 |

(Continued)

OTHER PUBLICATIONS

Japanese Office Action for corresponding JP 2012-033422, dated Jul. 23, 2013.

*Primary Examiner* — Nelson D. Hernández Hernández
(74) *Attorney, Agent, or Firm* — Rossi, Kimms & McDowell LLP (57) ABSTRACT

An image processing apparatus includes an image obtaining portion 200 that obtains a first and second images having exposures different from each other, a region selecting portion 203 that selects a first region different from a region containing a luminance saturation part from the first image, and that selects a second region corresponding to the region containing the luminance saturation part of the first image from the second image, an image restoration processing portion 201 that performs an image restoration processing using an image restoration filter generated based on an optical transfer function for the first region of the first image and the second region of the second image, and an image replacing portion 202 that replaces the region containing the luminance saturation part of the first image with the second region of the second image so as to synthesize the first and second regions to generate one image.

10 Claims, 7 Drawing Sheets

(52) U.S. Cl.
CPC ... *G06T 2200/21* (2013.01); *G06T 2207/10016* (2013.01); *G06T 2207/20208* (2013.01)

(56) References Cited

U.S. PATENT DOCUMENTS

2010/0053346 A1* 3/2010 Mitsunaga ................ 348/208.6
2010/0091119 A1* 4/2010 Lee ........................... 348/208.4
2012/0281111 A1* 11/2012 Jo et al. ..................... 348/229.1

FOREIGN PATENT DOCUMENTS

| | | |
|---|---|---|
| JP | 2009-296179 A | 12/2009 |
| JP | 2010-178164 A | 8/2010 |
| JP | 2010-257179 A | 11/2010 |

* cited by examiner

IMAGE RESTORATION FILTER

IMAGE PROCESSING APPARATUS FOR CORRECTING AN ABERRATION OF AN IMAGE CONTAINING A LUMINANCE SATURATION PART, IMAGE PICKUP APPARATUS, IMAGE PROCESSING METHOD, AND NON-TRANSITORY RECORDING MEDIUM STORING PROGRAM

BACKGROUND OF THE INVENTION

1. Field of the Invention

The present invention relates to an image processing apparatus that performs an image restoration processing.

2. Description of the Related Art

Previously, a technology that synthesizes (composes) a plurality of images obtained by an image pickup apparatus such as a digital camera and that generates an image with a high dynamic range or an image with high quality or high resolution is proposed. Japanese Patent Laid-Open No. H5-153473 and Japanese Patent Laid-Open No. 2010-178164 disclose an image pickup apparatus that synthesizes images obtained with a short exposure and a long exposure so as to generate an image with a wide dynamic range. In Japanese Patent Laid-Open No. H5-153473, a processing in which a difference of each of images is decreased in synthesizing the images is performed so as to widen the dynamic range and prevent the deterioration of the image quality. In Japanese Patent Laid-Open No. 2010-178164, a luminance saturation part contained in the image obtained by the long exposure is specified, and the luminance saturation part is replaced with an image obtained by performing a gain adjustment and the short exposure so as to widen the dynamic range.

In Japanese Patent Laid-Open No. 2009-284009, a method of estimating an amount of blur of a color that appears around the luminance saturation part based on a first image containing the luminance saturation part and a second image containing more luminance saturation parts than the first image, and effectively removing the blur of the color is disclosed.

However, in image processing methods disclosed in Japanese Patent Laid-Open No. H5-153473 and Japanese Patent Laid-Open No. 2010-178164, due to the influence of the blur that is caused by an aberration of an image pickup optical system, the image quality is deteriorated. In an image processing method disclosed in Japanese Patent Laid-Open No. 2009-284009, it is difficult to correct the deterioration of the image quality caused by the aberration other than a chromatic aberration.

Therefore, as a method of correcting an image deterioration caused by the image pickup optical system, a method of using an image restoration filter generated based on an optical transfer function (OTF) of the image pickup optical system is known. According to this method, an asymmetric aberration that is generated by the image pickup optical system is appropriately corrected to be able to sharpen the image.

However, when a luminance (luminance information) which exceeds a permissible value of the luminance that can be obtained by an image pickup element is given on an image pickup surface of the image pickup element, i.e. an image containing the luminance saturation part is obtained, the correction of the asymmetric aberration or the sharpening cannot be appropriately performed. In other words, since the luminance information that exceeds the permissible value of the image pickup element is missing, a correct image restoration cannot be performed even when the image restoration processing is performed for the missing luminance information.

SUMMARY OF THE INVENTION

The present invention provides an image processing apparatus, an image pickup apparatus, an image processing method, and a non-transitory recording medium storing a program that effectively reduce an aberration of an image containing a luminance saturation part.

An image processing apparatus as one aspect of the present invention includes an image obtaining portion configured to obtain a first image and a second image that have exposures different from each other, a region selecting portion configured to select a first region that is different from a region containing a luminance saturation part from the first image, and select a second region that corresponds to the region containing the luminance saturation part of the first image from the second image, an image restoration processing portion configured to perform an image restoration processing using an image restoration filter generated based on an optical transfer function for the first region of the first image and the second region of the second image, and an image replacing portion configured to replace the region containing the luminance saturation part of the first image with the second region of the second image so as to synthesize the first region of the first image and the second region of the second image to generate one image.

An image pickup apparatus as another aspect of the present invention includes an image obtaining portion configured to obtain a first image and a second image that have exposures different from each other, a region selecting portion configured to select a first region that is different from a region containing a luminance saturation part from the first image, and select a second region that corresponds to the region containing the luminance saturation part of the first image from the second image, an image restoration processing portion configured to perform an image restoration processing using an image restoration filter generated based on an optical transfer function for the first region of the first image and the second region of the second image, and an image replacing portion configured to replace the region containing the luminance saturation part of the first image with the second region of the second image so as to synthesize the first region of the first image and the second region of the second image to generate one image.

An image processing method as another aspect of the present invention includes the steps of obtaining a first image and a second image that have exposures different from each other, selecting a first region that is different from a region containing a luminance saturation part from the first image, and selecting a second region that corresponds to the region containing the luminance saturation part of the first image from the second image, performing an image restoration processing using an image restoration filter generated based on an optical transfer function for the first region of the first image and the second region of the second image, and replacing the region containing the luminance saturation part of the first image with the second region of the second image so as to synthesize the first region of the first image and the second region of the second image to generate one image.

A non-transitory recording medium as another aspect of the present invention stores a program for causing an information processing apparatus to execute an image processing method, and the method includes the steps of obtaining a first image and a second image that have exposures different from each other, selecting a first region that is different from a region containing a luminance saturation part from the first image, and selecting a second region that corresponds to the region containing the luminance saturation part of the first image from the second image, performing an image restoration processing using an image restoration filter generated based on an optical transfer function for the first region of the first image and the second region of the second image, and replacing the region containing the luminance saturation part of the first image with the second region of the second image so as to synthesize the first region of the first image and the second region of the second image to generate one image.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

First of all, definitions of terms that are described in the present embodiment and an image restoration processing (an image processing method) will be described. The image processing method described here will be appropriately used in each of embodiments described below.

[Input Image]

An input image is a digital image (a shot image) that is obtained by receiving light on an image pickup element via an image pickup optical system, which is deteriorated in accordance with an optical transfer function OTF due to an aberration of the image pickup optical system that includes a lens and various kinds of optical filters. The image pickup optical system can also be configured by using a mirror (a reflection surface) that has a curvature, as well as a lens.

A color component of the input image, for example, has information of RGB color components. As a color component, in addition to that, a color space that is commonly used such as brightness, color phase, or chroma represented by LCH, luminance represented by YCbCr, or a color-difference signal can be selectively used. As another color space, XYZ, Lab, Yuv, or JCh can also be used. Furthermore, a color temperature may also be used.

An image pickup condition such as a focal length of a lens, an F-number (an aperture value), or an object distance, or various kinds of correction information to correct this image can be added to the input image or an output image. When the image is transferred from an image pickup apparatus to an image processing apparatus that is separated from the image pickup apparatus to perform a correction processing, it is preferred that the image pickup condition or the information relating to the correction be added to the image as described above. As another method of transferring the image pickup condition or the information relating to the correction, the image pickup apparatus and the image processing apparatus may also be directly or indirectly connected with each other to transfer it between them.

[Optical Transfer Function (OTF)]

The optical transfer function (OTF) that is obtained by performing the Fourier transform is frequency component information of the aberration, which is represented by a complex number. An absolute value of the optical transfer function OTF, i.e. amplitude component is referred to as an MTF (Modulation Transfer Function), and a phase component is referred to as a PTF (Phase Transfer Function). The amplitude component MTF and the phase component PTF are frequency characteristics of an amplitude component and a phase component of the image deterioration caused by the aberration, respectively, and the phase component is represented as a phase angle by the following Expression (1).

$$PTF = \tan^{-1}(Im(OTF)/Re(OTF)) \quad (1)$$

In Expression (1), Re(OTF) and Im(OTF) indicate a real part and an imaginary part of the optical transfer function OTF, respectively. Thus, the optical transfer function OTF of the image pickup optical system deteriorates the amplitude component MTF and the phase component PTF of the image, and therefore the deteriorated image is in a state where each point of the object is asymmetrically blurred similarly to the coma aberration.

Chromatic aberration of magnification is generated because an imaging position is shifted by the difference of an imaging magnification for each wavelength of light and it is obtained as color components of for example RGB in accordance with the spectroscopic characteristics of an image pickup apparatus. Therefore, in addition to the shift of the imaging position among the color components of RGB, the shift of the imaging position for each wavelength, i.e. a spread of an image caused by the phase shift, is generated also in each color component. Accordingly, to be exact, the chromatic aberration of magnification is not simply the color shift of a parallel shift, and also influences spread of the image of a color channel such as a G channel.

[Image Restoration Processing]

Subsequently, an outline of the image restoration processing will be described. When the shot image (the deteriorated image) is denoted by g(x,y), an original image is denoted by f(x,y), and a point spread function PSF that is a Fourier pair of the optical transfer function OTF is denoted by h(x,y), the following Expression (2) is met.

$$g(x,y) = h(x,y) * f(x,y) \quad (2)$$

In Expression (2), symbol * denotes a convolution (a product sum), and symbol (x,y) denotes a coordinate on the shot image.

When the Fourier transform is performed for Expression (2) to be transformed to a display format on a frequency plane, Expression (3) that is represented as a product for each frequency is obtained.

$$G(u,v)=H(u,v)\cdot F(u,v) \quad (3)$$

In Expression (3), symbol H denotes an optical transfer function OTF that is obtained by performing the Fourier transform for the point spread function PSF(h), and symbols G and F denote functions that are obtained by performing the Fourier transform for the deteriorated image g and the original image f, respectively. Symbol (u,v) denotes a coordinate on a two-dimensional frequency plane, i.e. a frequency.

In order to obtain the original image f from the shot deteriorated image g, as represented by the following Expression (4), both sides may be divided by the optical transfer function h.

$$G(u,v)/H(u,v)=F(u,v) \quad (4)$$

Then, the inverse Fourier transform is performed for F(u,v), i.e. G(u,v)/H(u,v), to be restored on a real plane to obtain the original image f(x,y) as a restored image.

When symbol R denotes a value that is obtained by performing the inverse Fourier transform for $H^{-1}$, the original image f(x,y) can be similarly obtained by the convolution processing for the image on the real plane as represented by the following Expression (5).

$$g(x,y)*R(x,y)=f(x,y) \quad (5)$$

In Expression (5), symbol R(x,y) is called an image restoration filter. When the image is a two-dimensional image, commonly, the image restoration filter R is also a two-dimensional filter that has taps (cells) corresponding to each of pixels of the image. Generally, as the number of the taps (the number of the cells) of the image restoration filter R is large, the restoration accuracy is improved. Therefore, the number of the taps that can be realized is set in accordance with characteristics such as a required image quality, an image processing capability, or an aberration. Since the image restoration filter R needs to reflect at least the characteristics of the aberration, it is different from a conventional edge enhancement filter (a high-pass filter) that has around three taps horizontally and vertically. Since the image restoration filter R is set based on the optical transfer function OTF, both the deteriorations of an amplitude component and a phase component can be corrected with high accuracy.

Since a real image contains a noise component, the noise component is significantly amplified as the deteriorated image is restored when the image restoration filter R that is generated by using the complete inverse of the optical transfer function OTF is used. This is because MTF is held up so as to restore the MTF (the amplitude component) of the optical system to 1 over an entire frequency for a state where amplitude of the noise is added to the amplitude component of the image. Although the MTF that is amplitude deterioration caused by the optical system is restored to 1, at the same time, a power spectrum of the noise is also held up, and as a result, the noise is amplified in accordance with the degree (a restoration gain) to hold up the MTF.

Therefore, when the noise is contained, an appropriate image as an ornamental image cannot be obtained. This is represented by the following Expressions (6-1) and (6-2).

$$G(u,v)=H(u,v)\cdot F(u,v)+N(u,v) \quad (6\text{-}1)$$

$$G(u,v)/H(u,v)=F(u,v)+N(u,v)/H(u,v) \quad (6\text{-}2)$$

In Expressions (6-1) and (6-2), symbol N denotes a noise component.

With regard to the image that contains the noise component, for example as Wiener filter represented by the following Expression (7), there is a method of controlling the restoration degree in accordance with an intensity ratio SNR of an image signal to a noise signal.

$$M(u,v) = \frac{1}{H(u,v)} \frac{|H(u,v)|^2}{|H(u,v)|^2 + SNR^2} \quad (7)$$

In Expression (7), symbol M(u,v) is frequency characteristics of the Wiener filter, and symbol |H(u,v)| is an absolute value (the amplitude component MTF) of the optical transfer function OTF. In this method, for each frequency, the restoration gain (the restoration degree) is reduced as the MTF is small, and the restoration gain is increased as the MTF is large. Commonly, since the MTF of the image pickup optical system is high at a low frequency side and is low at a high frequency side, this method substantially reduces the restoration gain at the high frequency side of the image.

Figure 3:
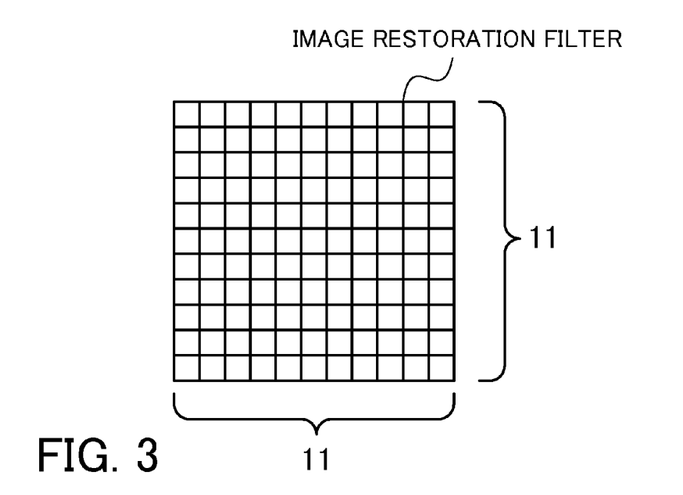
FIG. 3 is a diagram of describing an image restoration filter that is used in the image processing method in each of embodiments.
Figure 4:
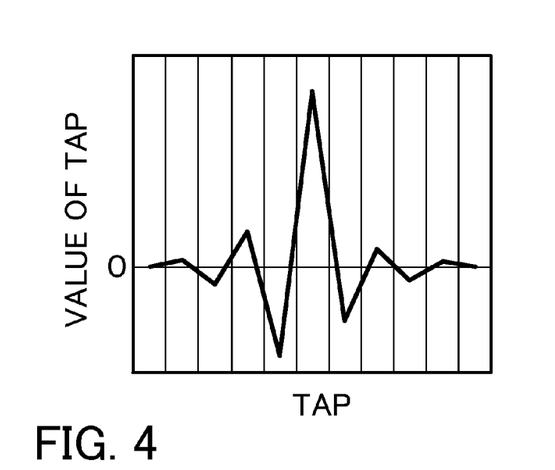
FIG. 4 is a diagram of describing an image restoration filter that is used in the image processing method in each of the embodiments.

Subsequently, referring to FIGS. 3 and 4, the image restoration filter will be described. In the image restoration filter, the tap number is determined in accordance with the aberration characteristics of the image pickup optical system or the required restoration accuracy. The image restoration filter in FIG. 3 is a two-dimensional filter having 11×11 taps as one example. In FIG. 3, a value (a coefficient) in each tap is omitted, and one cross section of this image restoration filter is illustrated in FIG. 4. A distribution of the value (the coefficient value) of each tap of the image restoration filter has a function that restores a signal value (PSF) that is spatially spread by the aberration to one original point ideally.

The convolution processing (the convolution or the product sum) is performed for each tap of the image restoration filter in a step of the image restoration processing with respect to each pixel of the image. In the convolution processing, in order to improve a signal value of a predetermined pixel, the pixel is set to coincide with a center of the image restoration filter. Then, a product of the signal value of the image and the coefficient value of the filter is obtained for each image and each corresponding pixel of the image restoration filter, and the total sum is replaced as a signal value of the center pixel.

Figure 5A:
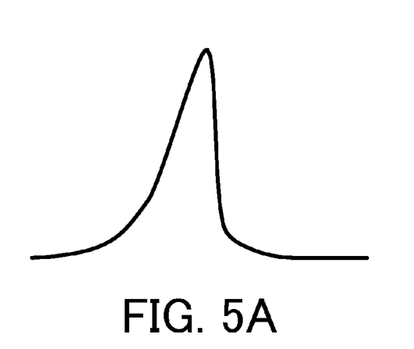
FIGS. 5A and 5B are diagrams of describing a correction state of a point image of the image processing method in each of the embodiments.
Figure 5B:
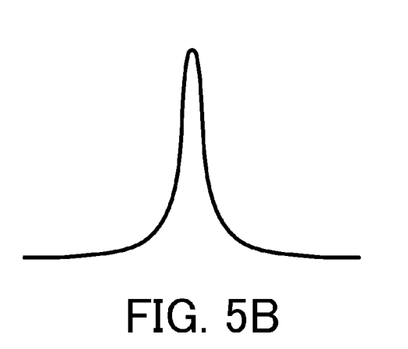
Figure 6A:
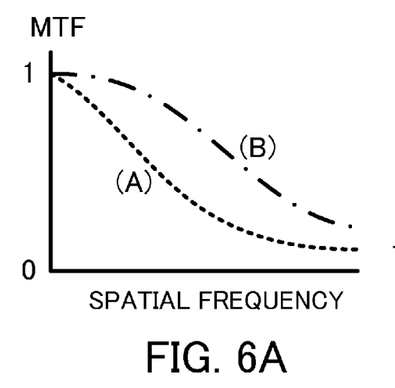
FIGS. 6A and 6B are diagrams of am amplitude component and a phase component of an optical transfer function in each of the embodiments.
Figure 6B:
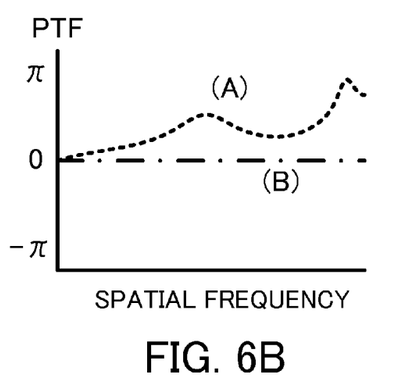

Subsequently, referring to FIGS. 5A, 5B, 6A, and 6B, characteristics in a real space and a frequency space of the image restoration will be described. FIGS. 5A and 5B are diagrams of describing the point spread function PSF, and FIG. 5A illustrates the point spread function PSF before the image restoration is performed and FIG. 5B illustrates the point spread function PSF after the image restoration is performed. FIGS. 6A and 6B are diagrams of describing an amplitude component MTF and a phase component PTF of the optical transfer function OTF. A dashed line (A) in FIG. 6A illustrates the MTF before the image restoration is performed, and a dashed-dotted line (B) illustrates the MTF after the image restoration is performed. A dashed line (A) in FIG. 6B illustrates the PTF before the image restoration is performed, and a dashed-dotted line (B) illustrates the PTF after the image restoration is performed. As illustrated in FIG. 5A, the point spread function PSF before the image restoration is asymmetrically spread, and the phase component PTF has a non-linear value with respect to the frequency due to this asymmetry. Since the image restoration processing amplifies the amplitude component MTF and performs a correction so that the phase component PTF becomes zero, the point spread function PSF after the image restoration has a symmetric and sharpened shape.

Thus, the image restoration filter can be obtained by the inverse Fourier transform for the function that is designed based on the inverse function of the optical transfer function OTF of the image pickup optical system. The image restoration filter that is used in the present embodiment can be changed if necessary, and for example the Wiener filter as described above can be used. When the Wiener filter is used, the image restoration filter in a real space where an image is really convoluted can be generated by performing the inverse Fourier transform for Expression (7). The optical transfer function OTF is also changed in accordance with an image height of the image pickup optical system (a position of the image) even in one image pickup state. Therefore, the image restoration filter is used by changing in accordance with the image height.

Embodiment 1

Figure 1:
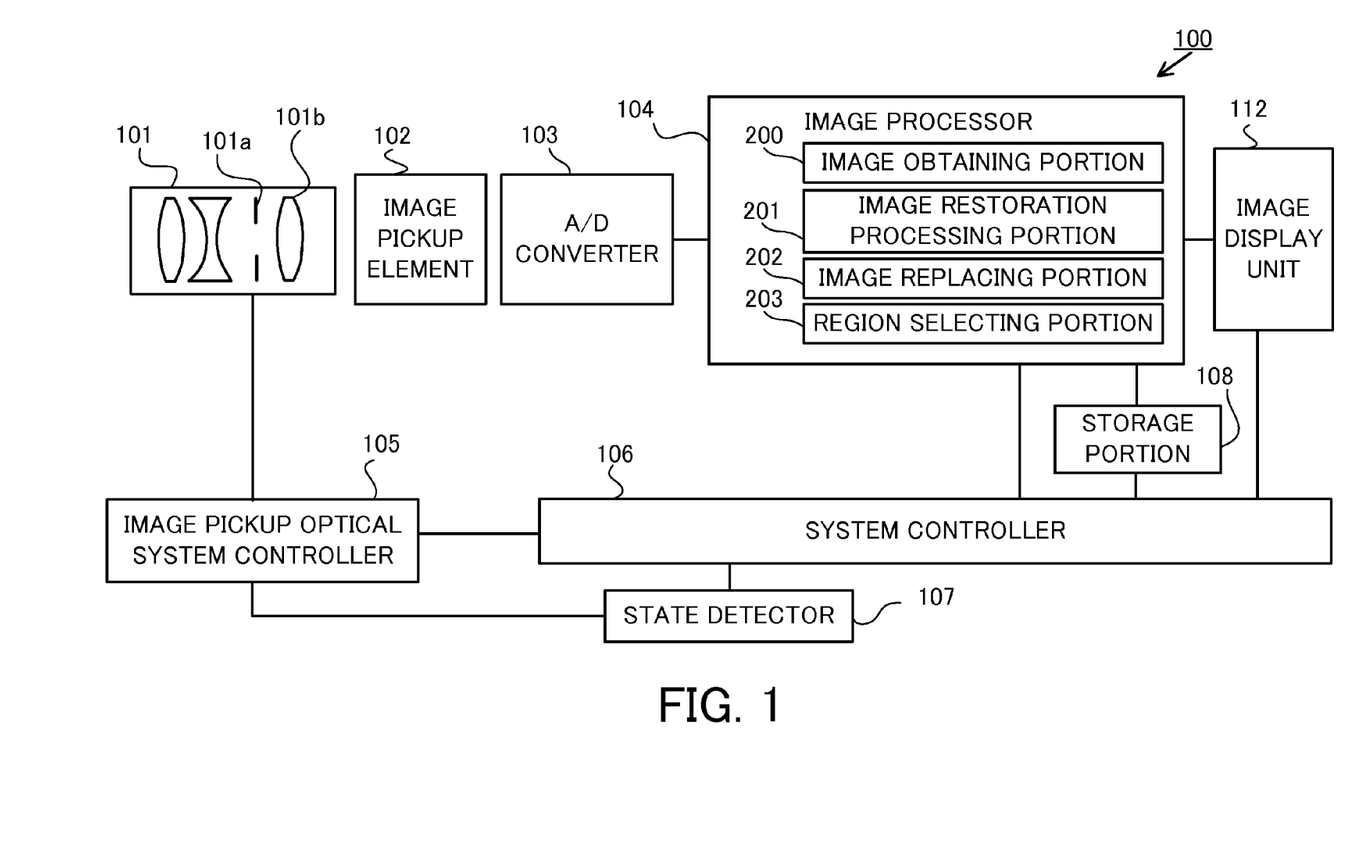
FIG. 1 is a configuration diagram of an image pickup apparatus in Embodiment 1.

First of all, referring to FIG. 1, an image pickup apparatus in Embodiment 1 of the present invention will be described. FIG. 1 is a configuration diagram of an image pickup apparatus 100 in the present embodiment. In the image pickup apparatus 100, a program that performs the image restoration processing (the image processing method) for a shot image is installed, and this image restoration processing is performed by an image processor 104 (an image processing apparatus) in the image pickup apparatus 100.

The image pickup apparatus 100 is configured by including an image pickup optical system 101 (a lens) and an image pickup apparatus body (a camera body). The image pickup optical system 101 includes a stop 101a and a focus lens 101b, which is configured integrally with the image pickup apparatus body (the camera body). However, the present embodiment is not limited to this, and can also be applied to an image pickup apparatus (an image pickup system) in which the image pickup optical system 101 is interchangeably mounted on the image pickup apparatus body.

An image pickup element 102 is a two-dimensional image pickup element such as a CCD (Charge Coupled Device) or a CMOS (Complementary Metal-Oxide Semiconductor). The image pickup element 102 performs a photoelectric conversion of an object image (imaging light) that is obtained via the image pickup optical system 101 so as to generate the shot image. In other words, the photoelectric conversion is performed by the image pickup element 102 for the object image so as to be converted into an analog signal (an electric signal). Then, this analog signal is converted into a digital signal by an A/D converter 103, and this digital signal is inputted to the image processor 104.

The image processor 104 (the image processing apparatus) performs a predetermined processing for this digital signal and also performs a predetermined image restoration processing. First of all, the image processor 104 obtains image pickup condition information of the image pickup apparatus 100 from a state detector 107. The image pickup condition information means information relating to a stop, an object distance, a focal length of a zoom lens, or the like. The state detector 107 can directly obtain the image pickup condition information from a system controller 106, but the embodiment is not limited this. For example, the image pickup condition information relating to the image pickup optical system 101 can also be obtained from an image pickup optical system controller 105.

Subsequently, an image restoration filter depending on the image pickup condition (the image pickup condition information) is selected from a storage portion 108 (a memory), and the image restoration processing and an image composite processing are performed for the image inputted to the image processor 104. These processings are, as described below, performed by an image obtaining portion 200 (an image obtaining unit), an image restoration processing portion 201 (an image restoration processor), an image replacing portion 202 (an image replacing unit), and a region selecting portion 203 (a region selecting unit). An output image processed by the image processor 104 is stored in the storage portion 108 with a predetermined format. An image display unit 112 can display an image that is obtained by performing a predetermined processing for the display after image restoration processing and the image composite processing. The image display unit 112 may also display an image that is obtained by performing a simple processing for fast display. A series of controls described above are performed by the system controller 106. A mechanical drive of the image pickup optical system 101 is performed by the image pickup optical system controller 105 based on an instruction of the system controller 106.

An optical element such as a low-pass filter or an infrared cut filter may also be inserted into the image pickup optical system 101. When the element such as the low-pass filter that influences on characteristics of the optical transfer function (OTF) is used, a highly-accurate image restoration processing can be performed considering the influence of this element at the time of generating the image restoration filter. Since the infrared cut filter also influences on each point spread function (PSF) of RGB channels that is a value of integral of the PSF of a spectral wavelength, particularly, the PSF of the R channel, it is preferred that the influence of the element be considered at the time of generating the image restoration filter.

Figure 2:
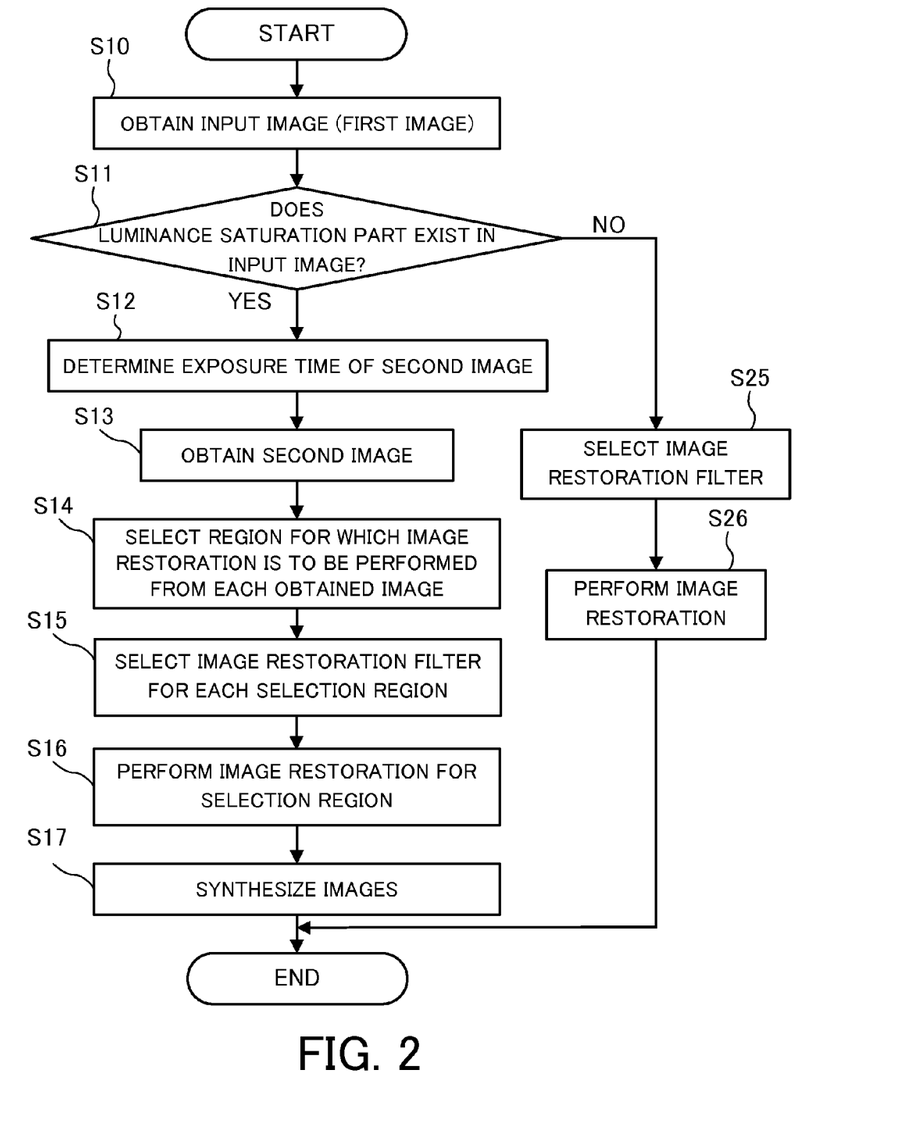
FIG. 2 is a flowchart of illustrating an image processing method in Embodiment 1.

Next, referring to FIG. 2, the image processing method in the present embodiment will be described. FIG. 2 is a flowchart of illustrating the image processing method in the present embodiment. Each step of FIG. 2 is performed by the image processor 104 based on the instruction of the system controller 106.

First of all, in Step S10, the image obtaining portion 200 of the image processor 104 obtains a shot image as an input image (a first image). Subsequently, in Step S11, the image processor 104 determines whether the input image contains a luminance saturation part (a luminance saturation pixel) in the input image. The luminance saturation part means a region where a luminance of the obtained image exceeds a permissible amount (a dynamic range) of the image pickup element 102. When the input image does not contain the luminance saturation part in Step S11, a conventional image restoration processing can be performed. Therefore, an image restoration filter is selected in Step S25, and the image restoration processing is performed in Step S26. Since Steps S25 and S26 are processings similar to those in Steps S15 and S16 described below, respectively, detailed descriptions of the steps are omitted. On the other hand, when the input image contains the luminance saturation part in Step S11, the flow proceeds to Step S12.

Figure 7:
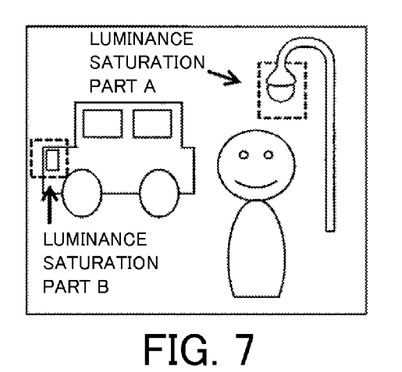
FIG. 7 is a diagram of describing an input image that is obtained by the image pickup apparatus in each of the embodiments.

FIG. 7 is a diagram of describing the input image that is obtained by the image pickup apparatus 100 in the present embodiment, which illustrates a case where a luminance distribution of the obtained image exceeds the dynamic range of the image pickup apparatus 100. As illustrated in FIG. 7, when the obtained image contains a region of indicating a high luminance (a high luminance part) such as a street light (a luminance saturation part A) and a car light (a luminance saturation part B), such high luminance parts have extremely high luminance compared to other image regions. Therefore, when the image is taken using an AE device (an automatic exposure controller) or the like, commonly, a balance of a whole of the luminance distribution is considered, and in many cases, the image of the high luminance part is outputted as an image of a luminance saturation state, i.e. as an image from the luminance saturation part. As described above, when the image restoration processing (a correction processing) is performed for the image containing the luminance saturation part, the image restoration cannot be correctly performed. Therefore, in the present embodiment, an image (a second image) that has an exposure time shorter than that of the image (the first image) obtained in Step S10 is obtained. Then, the image in the luminance saturation part of the image (the first image) obtained in Step S10 is replaced with an image in the corresponding region of the second image. The first image is assumed to be an image that is taken in the exposure time which is determined to be an optimum exposure by a user, the AE device of the image pickup apparatus 100, or the like, considering the luminance distribution for whole of the image.

Next in Step S12, the image processor 104 determines the exposure time for the second image. Since the second image is used for replacing the luminance saturation part of the first image, it is preferred that the second image do not contain the luminance saturation part (the luminance saturation pixel). Therefore, it is necessary to set the exposure time for the second image to be shorter than the exposure time for the first image. However, if the exposure time for the second image is set to be too short, a ratio of a noise with respect to an output signal of the image pickup element 102 is heightened and the noise is increased in performing the image restoration processing. Therefore, it is preferred that the exposure time for the second image be as long as possible, in addition to the condition that a target region (a region corresponding to the luminance saturation part of the first image) does not contain the luminance saturation part. Accordingly, in order to obtain an ideal composite image, it is necessary to appropriately set the exposure time in obtaining the second image.

Figure 9:
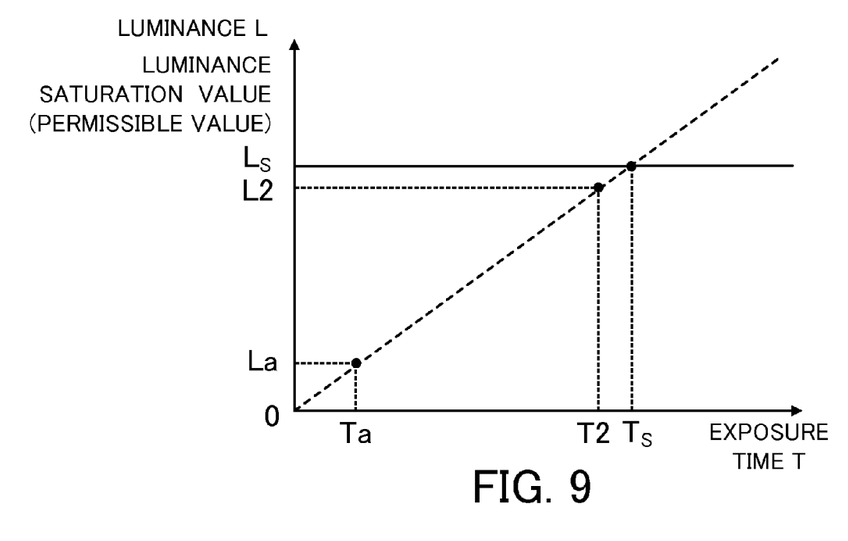
FIG. 9 is a diagram of describing a method of determining an appropriate exposure time of a second image in Embodiment 1.

Referring to FIG. 9, a method of appropriately determining the exposure time in obtaining the second image will be described. FIG. 9 is a diagram of describing the method of determining an appropriate exposure time for the second image, which illustrates a relation between an exposure time T of one pixel that is the luminance saturation part in the first image and a luminance L. First of all, an image is taken in an exposure time Ta in which the luminance saturation part does not exist, i.e. the luminance saturation part is vanished, which is sufficiently short. In this case, the exposure time Ta may be an arbitrary time in which the luminance saturation part is vanished from the target region. For example, the exposure time Ta is a minimum exposure time of the image pickup apparatus 100.

Subsequently, using a ratio La/Ta of a luminance La of a target pixel (a pixel contained in the target region) in the shot image and the exposure time Ta, an approximate straight line is obtained. This approximate straight line is represented as the following Expression (8), where L is the luminance and T is the exposure time.

$$L = \frac{La}{Ta} \times T \tag{8}$$

Substituting a luminance saturation value Ls into Expression (8), an exposure time Ts in which the target pixel reaches the luminance saturation can be obtained. When a plurality of luminance saturation pixels are contained in the target region in the first image, the exposure time Ts is the shortest exposure time of the exposure times for the plurality of luminance saturation pixels. The exposure time T2 (an exposure time corresponding to a luminance L2) that is shorter than the exposure time Ts and that is longest of settable exposure times is determined as the exposure time in obtaining the second image.

Subsequently, in Step S13, the exposure time which is determined in Step S12 is transferred from the image processor 104 to the image pickup optical system controller 105 via the system controller 106 so as to reset the exposure time. Then, similarly to obtaining the first image in Step S10, the second image is obtained as the input image. Thus, in Steps S10 and S13, the image obtaining portion 200 obtains the first image and the second image that have exposures different from each other.

Figure 8A:
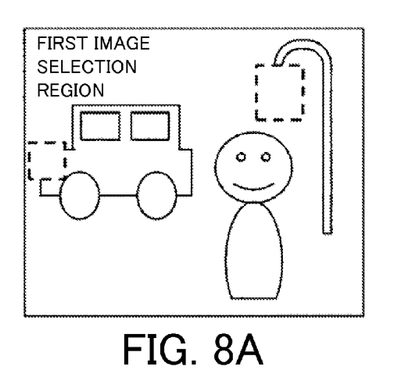
FIGS. 8A and 8B are diagrams of describing regions of performing an image restoration processing in Embodiment 1.
Figure 8B:
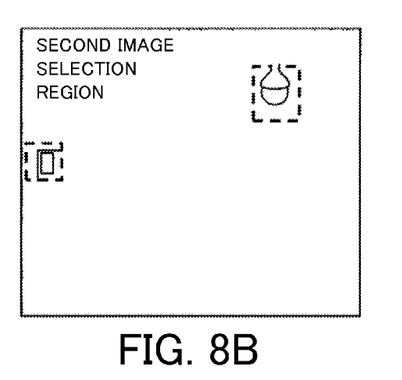

Next, in Step S14, a region selecting portion 203 of the image processor 104 determines a region for which the image restoration processing is performed for each of the first image obtained in Step S10 and the second image obtained in Step S13. FIGS. 8A and 8B are diagrams of describing the region for which the image restoration processing is performed when the input image illustrated in FIG. 7 is obtained as the first image and the second image respectively. FIG. 8A illustrates a region (a first image selection region) for which the image restoration processing is performed for the first image, and FIG. 8B illustrates a region (a second image selection region) for which the image restoration processing is performed for the second image.

The first image is an image (a pixel) which has an optimum luminance distribution for whole of the image. Therefore, a region other than the luminance saturation part that is configured by the luminance saturation pixel or both the luminance saturation pixel and its peripheral pixel, i.e. a region other than the luminance saturation parts A and B, is selected as a region for which the image restoration processing is performed (the first image selection region). On the other hand, the second image is used for replacing the luminance saturation part, i.e. the luminance saturation parts A and B, of the first image after the image restoration is performed. Therefore, the second region corresponding to the luminance saturation part of the first image is selected as a region for which the image restoration processing is performed (the second image selection region). Thus, the region selecting portion 203 selects a first region (a first image selection region) that is different from a region containing the luminance saturation part from the first image, and selects a second region (a second image selection region) that corresponds to a region containing the luminance saturation part of the first image from the second image.

In the present embodiment, for efficiency, a region which is used as a composite image (a synthetic image) is only selected as the region for which the image restoration processing is performed. In other words, the image restoration processing portion 201 performs the image restoration processing only for the first region of the first image and the second region of the second image. However, the present embodiment is not limited to this. For example, in order to simplify the processing, whole of the first image and the second image is selected as the region for which the image restoration processing may also be performed so as to extract only a pixel (an image) which is necessary to obtain the composite image after the image restoration processing is performed. In this case, the image restoration processing portion 201 performs the image restoration processing for the whole of the first image and the second image.

Next, in Step S15, an image restoration filter which is suitable for the image pickup condition is selected. In other words, the image restoration filter which is suitable for each selected region is selected. The image pickup condition is a focal length, a stop value, an object distance, or the like. Information relating to the image pickup condition can be directly obtained from the image pickup apparatus 100. The image restoration filter can be selected from data that are previously stored in the image processor 104, or alternatively can be generated by correcting the previously stored data in accordance with the image pickup condition. In the present embodiment, with respect to positions in an image, an image restoration filter between the positions is generated by a predetermined interpolation processing using the data of the image restoration filter that are previously stored discretely. The interpolation processing is, for example, performed using a bilinear interpolation (a linear interpolation) or a bicubic interpolation, but the embodiment is not limited to them. The stop, the object distance, the focal length of the zoom lens, and the like are also generated by the similar interpolation processing, and therefore an amount of data of the previously stored image restoration filter can be reduced. As the previously stored data, original data to generate the image restoration filter, such as PSF, OTF, MTF, PTF, frequency characteristics of the image restoration filter, can also be used to generate the image restoration filter by calculation.

Next, in Step S16, the image restoration processing portion 201 of the image processor 104 performs the image restoration processing for each of the regions (the first image selection region and the second image selection region) for which the image restoration is performed using the image restoration filter selected in Step S15. In other words, the image restoration processing portion 201 performs the image restoration processing using the image restoration filter generated based on the optical transfer function OTF for each of the first region (the first image selection region) of the first image and the second region (the second image selection region) of the second image.

When the luminance saturation pixel (the luminance saturation part) does not exist in each region for which the image restoration processing is performed, an aberration (an asymmetric aberration) in each region is appropriately corrected after the image restoration processing is performed, and therefore the luminance distribution of the image is sharpened. In the embodiment, using the image restoration filter that is generated based on the optical transfer function (OTF) of the image pickup optical system 101, the image restoration processing of each region which is deteriorated by the aberration of the image pickup optical system 101 is performed. When the image restoration filter is designed so that an image restoration degree, i.e. an image restoration gain, is heightened, the image comes close to an ideal image, but a noise is also amplified as the image is sharpened. Therefore, it is preferred that a restored image performance and an amount of noise be balanced by appropriately adjusting the image restoration degree.

Next, in Step S17, each of the regions (the first image selection region and the second image selection region) for which the image restoration processing has been performed is synthesized (composed) so as to generate one image that has a sharpened luminance distribution. In other words, the image replacing portion 202 replaces the region containing the luminance saturation part of the first image with the second region of the second image (the second image selection region), and synthesizes (composes) the first region of the first image (the first image selection region) and the second region of the second image (the second image selection region) so as to generate one image.

An exposure of each image for which the image restoration processing has been performed is different from each other. Therefore, first of all, the exposure of each image is adjusted. In other words, when the image replacing portion 202 replaces the region containing the luminance saturation part of the first image with the second region of the second image, an exposure adjustment is performed so that an exposure of the second image is the same as an exposure of the first image before the image restoration processing is performed. For example, it is assumed that an F-number and ISO sensitivity of the first image are the same as those of the second image respectively, and an exposure time T1 of the first image and an exposure time T2 of the second image have a relation of T1=T2×2. In this case, the luminance of the first image is amplified twice compared to the luminance of the second image. Therefore, amplifying the luminance of the restored image that is extracted from the second image twice, the exposure is adjusted. In the embodiment, although the F-number and the ISO sensitivity of the first image are the same as those of the second image respectively, they may not need to be equal to each other. In this case, the luminance is increased or decreased for each region which is used for synthesizing the images, in accordance with a change of each variable so that the exposures of the images coincide with each other. After performing this processing for each region, the image replacing portion 202 of the image processor 104 pastes (synthesizes) the images of each region to be able to the composite image that is sharpened and that has no feeling of strangeness.

When the image is replaced, in addition to the processing for adjusting the exposures between the images, a processing that is performed so that the generated image appears more natural may also be performed for the second region of the second image or the first region of the first image. There are various kinds of these processing, and for example, in order not to make the way of the change of the luminance abrupt, a smoothing filter is considered to be applied to a pixel at the boundary or its peripheral pixel. These processing may be performed for an image before the image is replaced, or alternatively, a processing that is performed so that an inclination of the luminance is gradual may be applied after the image is replaced.

In the present embodiment, changing the exposure time, i.e. using the exposure times different from each other, the first image and the second image that have exposures different from each other are obtained by the image obtaining portion 200, but the embodiment is not limited to this. For example, the exposure may also be changed by changing the ISO sensitivity, the F-number, or an ND filter (a type of the ND filter).

In the embodiment, the exposure means a value that is used to change the luminance of the shot image, as well as a light intensity. When the ISO sensitivity is changed to obtain the images having exposures different from each other, in Step S12, ISO sensitivity which is appropriate to the second image is determined. In the present embodiment, an image which has a sufficiently short exposure time is taken, and the second image is introduced based on the relation between the luminance and the exposure time at that time, and the second image can also be introduced by the similar method when using the ISO sensitivity. Although a target parameter is different, the image is taken using a sufficiently low ISO sensitivity in which the luminance saturation part does not exist, and a relational expression that corresponds to Expression (8) is calculated based on the luminance and the ISO sensitivity at that time. The ISO sensitivity when the target pixel reaches the luminance saturation is obtained based on the calculated relational expression, and a value that is smaller than the ISO sensitivity and a maximum settable value is determined as the ISO sensitivity of the second image. After Step S13 is the processing similar to the present embodiment, and therefore the descriptions are omitted, and performing the processing in this way, a composite image that is sharpened and that has no feeling of strangeness for the ISO sensitivity can be generated. In addition, an appropriate second image can be obtained by calculating the relation that corresponds to the luminance of the target pixel in Step S12 even when the F-number or the ND filter is changed, and similarly the sharpened composite image can be generated.

Embodiment 2

Figure 12:
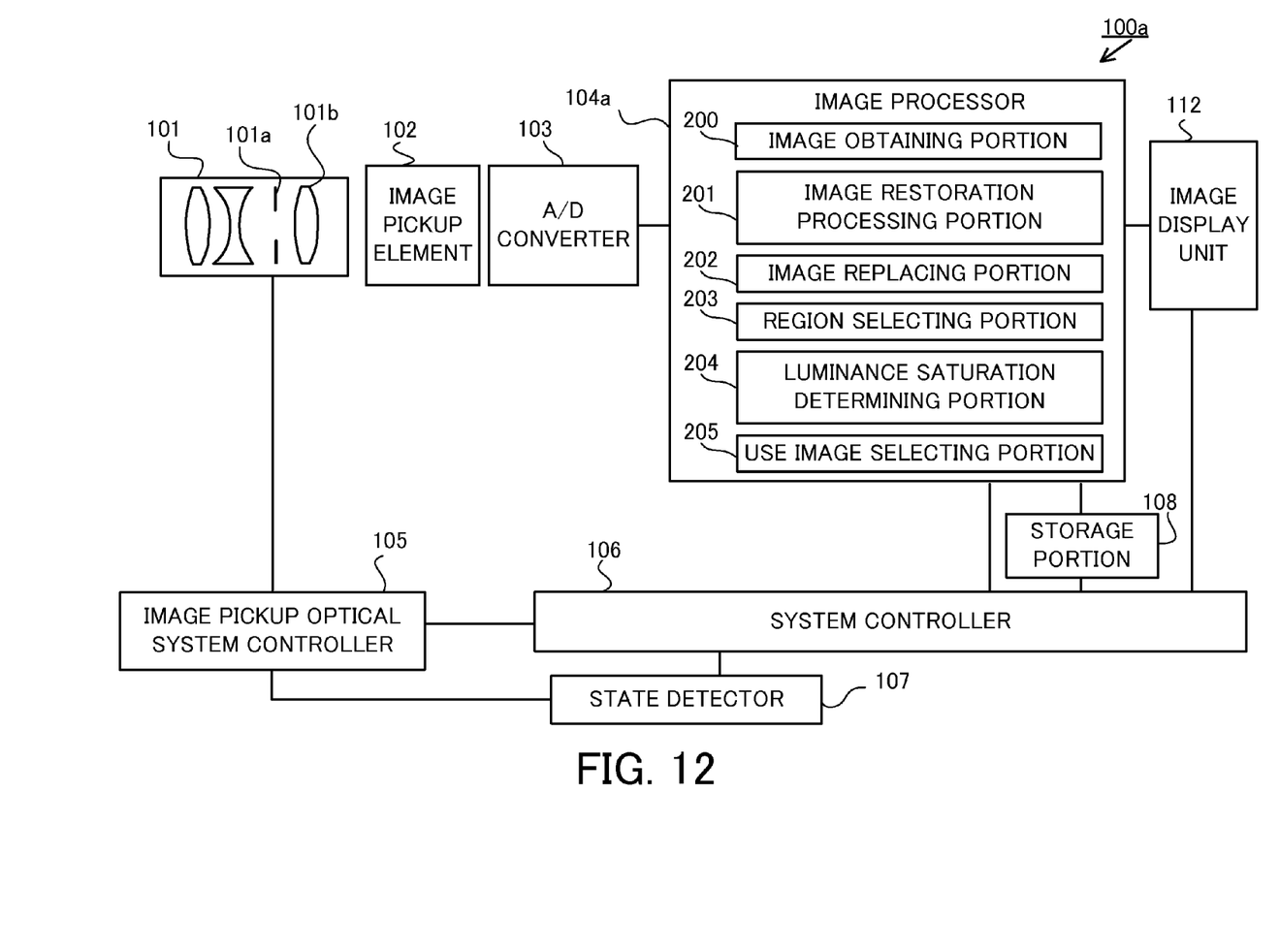
FIG. 12 is a configuration diagram of the image pickup apparatus in Embodiment 2.

Next, referring to FIG. 12, an image pickup apparatus in Embodiment 2 of the present invention will be described. FIG. 12 is a configuration diagram of an image pickup apparatus 100a in the present embodiment. In the image pickup apparatus 100a, a program that performs the image restoration processing (the image processing method) for a shot image is installed, and this image restoration processing is performed by an image processor 104a (an image processing apparatus) in the image pickup apparatus 100a. The image pickup apparatus 100a of the present embodiment has configurations common to those of the image pickup apparatus 100 of Embodiment 1 except for the image processor 104a, and therefore descriptions of the common configurations are omitted.

The image processor 104a is provided with a luminance saturation determining portion 204 and a use image selecting portion 205, in addition to each element of the image processor 104 of Embodiment 1. The luminance saturation determining portion 204 determines whether the luminance saturation pixel (the luminance saturation part) exists in an image or in a region of a target part of the image. The use image selecting part 205 selects an original input image that is to be used when generating a composite image. The details of the processing that is performed by the luminance saturation determining portion 204 and the use image selecting portion 205 will be described below.

Figure 10:
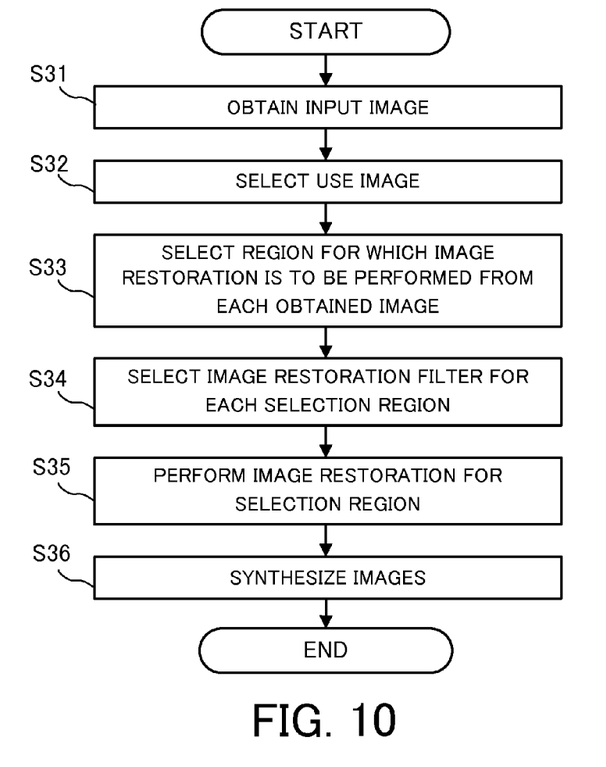
FIG. 10 is a flowchart of illustrating an image processing method in Embodiment 2.

Next, referring to FIG. 10, an image processing method in the present embodiment will be described. FIG. 10 is a flowchart of illustrating the image processing method in the present embodiment. Each step of FIG. 10 is performed by the image processor 104a based on an instruction of a system controller 106.

First of all, in Step S31, the image processor 104a obtains a plurality of shot images that have exposures different from each other as an input image. If the luminance saturation part (the luminance saturation pixel) does not exist in an image in which the luminance in a whole of the image is balanced (an image having an appropriate exposure) in the obtained input image, the image restoration processing can be directly performed. Therefore, similarly to Embodiment 1, it is assumed that the luminance saturation part is contained in the input image having the appropriate exposure. An image taken with the appropriate exposure is defined as a first image, and the first image is, as illustrated in FIG. 7, assumed to have the luminance saturation parts A and B.

Next, in Step S32, an original image that is used to replace the luminance saturation part in the first image is selected from among the plurality of input images obtained in Step S31. This selecting processing is performed by the use image selecting portion 205, and the original image that is used to replace the luminance saturation part A of the first image is defined as a second image, and the original image that is used to replace the luminance saturation part B of the first image is defined as a third image. In this case, it is preferred that the luminance saturation part (the luminance saturation pixel) be not contained in a region corresponding to the luminance saturation part A of the second image and in a region corresponding to the luminance saturation part B of the third image. The second image and the third image may also be the same image.

Figure 11A:
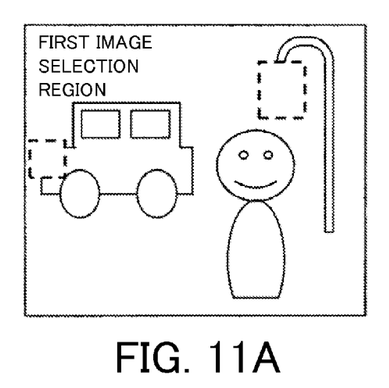
FIGS. 11A to 11C are diagrams of describing regions of performing the image restoration processing in Embodiment 2.
Figure 11B:
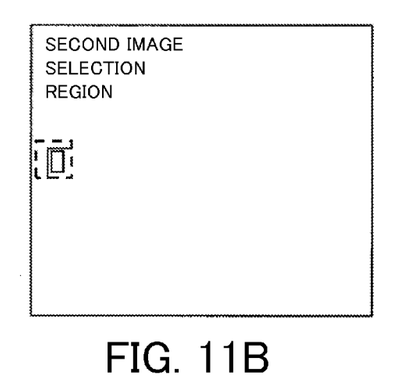
Figure 11C:
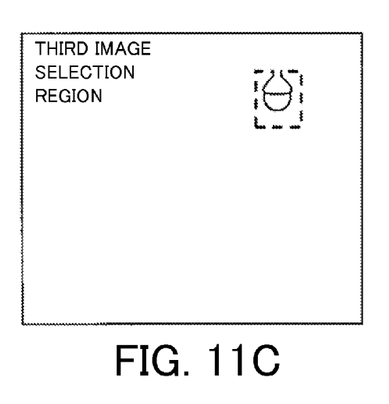

Next, in Step S33, for each of the first image, the second image, and the third image, a region for which the image processing is to be performed is determined. FIGS. 11A to 11C are diagrams of describing the region for which the image restoration processing is performed in a case where the input image illustrated in FIG. 7 is obtained as the first image, the second image, and the third image. FIG. 11A illustrates a region in the first image (a first image selection region) for which the image restoration processing is performed, FIG. 11B illustrates a region in the second image (a second image selection region) for which the image restoration processing is performed, and FIG. 11C illustrates a region in the third image (a third image selection region) for which the image restoration processing is performed.

The first image is an image that has an optimum luminance distribution in a whole of the image. Therefore, a region other than the luminance saturation part that is configured by the luminance saturation pixel or both the luminance saturation pixel and its peripheral pixel (a region other than the luminance saturation parts A and B) is selected as the region (the first image selection region) for which the image restoration processing is performed. With regard to the second image and the third image, each of regions of the second image and the third image that correspond to the luminance saturation parts A and B of the first image is set to be a region for which the image restoration is performed since the luminance saturation parts A and B of the first image is replaced after the image restoration is performed.

In the present embodiment, for efficiency, only the region that is used as the composite image is selected as a region for which the image restoration processing is performed, but the embodiment is not limited to this. For example, in order to simplify the processing, whole of the first image, the second image, and the third image may also be selected as the region for which the image restoration processing is performed, and then only the pixel necessary for the composite image is extracted after performing the image restoration processing so as to synthesize the images.

Next, in Step S34, an image restoration filter that is appropriate to each selecting region is selected. Subsequently, in Step S35, the image restoration processing portion 201 of the image processor 104a performs the image restoration processing for each of the regions (the first image selection region, the second image selection region, and the third image selection region) for which the image restoration is performed, using the image restoration filter selected in Step S34. Steps S34 and S35 are similar to Steps S15 and S16 of Embodiment 1 respectively, and therefore descriptions of the steps are omitted.

Finally, in Step S36, each of the regions (the first image selection region, the second selecting region, and the third selecting region) for which the image restoration processing has been performed is synthesized so as to generate one image that has the sharpened luminance distribution. In the embodiment, the exposure of each image for which the image restoration processing has been performed is different from each other. Therefore, first of all, the exposure of each image is adjusted. For example, it is assumed that the F-number and the ISO sensitivity of each of the first image, the second image, and the third image are the same and that the exposure time T1 of the first image and the exposure time T2 of the second image, and the exposure time T1 of the first image and the exposure time T3 of the third image have relations of T1=T2×2 and T1=T3×3, respectively. In this case, the luminance of the first image is amplified twice compared to the luminance of the second image, and it is amplified three times compared to the luminance of the third image. Therefore, amplifying the luminance of the restored image extracted from the second image and the third image twice and three times respectively, the exposures are adjusted. In the embodiment, although the F-number and the ISO sensitivity of each of the first image, the second image, and the third image are the same, respectively, they may not need to be equal to each other. In this case, the luminance is increased or decreased for each region which is used for synthesizing the images, in accordance with a change of each variable so that the exposures of the images coincide with each other. After performing this processing for each region, the image replacing portion 202 of the image processor 104a pastes (synthesizes) the images of each region to be able to the composite image that is sharpened and that has no feeling of strangeness.

In the present embodiment, the image restoration is performed for each region selected in Step S35, and then each region obtained after the image restoration is performed is synthesized in Step S36 so as to generate the sharpened image. In other words, the image replacing portion 202 performs the image restoration processing for the first region of the first image and the second region of the second image, and then synthesizes the first image and the second image. However, the present embodiment is not limited to this, and the order of these steps may also be replaced so as to synthesize the image before performing the image restoration. In this case, a predetermined exposure adjustment can be performed so as to generate one composite image in Step S36 when pasting (synthesizing) the image, and then the image restoration processing can be performed for the composite image so as to generate the sharpened composite image. In other words, the image restoration processing portion 201 synthesizes the first image and the second image by the image replacing portion 202, and then performs the image restoration processing for the first image and the second image.

In each of the embodiments described above, a case in which the image processor (the image processing apparatus or an information processing apparatus) is built in the image pickup apparatus is described, but the embodiment is not limited to this. For example, the image processor may also be provided in an information processing apparatus different from the image pickup apparatus.

According to the image processing apparatus of each of the embodiments described above, since a processing for reducing an aberration is performed using a plurality of images having exposures different from each other, an aberration can be effectively corrected even for the image containing the luminance saturation part, and an image that improves the sharpness can be generated. Therefore, according to each of the embodiments described above, an image processing apparatus, an image pickup apparatus, and an image processing method that effectively reduce the aberration of an image containing the luminance saturation part can be provided.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-033422, filed on Feb. 17, 2012, which is hereby incorporated by reference herein in its entirety.

What is claimed is:

1. An image processing apparatus comprising:
   an image obtaining portion configured to obtain a first image and a second image that have exposures different from each other;
   a region selecting portion configured to select a first region that is different from a region containing a luminance saturation part from the first image, and select a second region that corresponds to the region containing the luminance saturation part of the first image from the second image;
   an image restoration processing portion configured to perform an image restoration processing so as to reduce an aberration by using an image restoration filter generated based on an optical transfer function for the first region of the first image and the second region of the second image; and
   an image replacing portion configured to replace the region containing the luminance saturation part of the first image with the second region of the second image so as to synthesize the first region of the first image and the second region of the second image to generate one image,
   wherein the image restoration filter is generated based on the optical transfer function of an image pickup optical system which is used for taking the first image and the second image.

2. The image processing apparatus according to claim 1, wherein the image replacing portion performs an exposure adjustment so that an exposure of the second image is the same as an exposure of the first image obtained before the image restoration processing is performed in replacing the region containing the luminance saturation part of the first image with the second region of the second image.

3. The image processing apparatus according to claim 1, wherein the first image and the second image that have the exposures different from each other are images that are taken in a state where at least one of an exposure time, an ISO sensitivity, a stop value, and a type of ND filter for the images is different from each other.

4. The image processing apparatus according to claim 1, wherein the image replacing portion synthesizes the first image and the second image after the image restoration processing portion performs the image restoration processing for the first region of the first image and the second region of the second image.

5. The image processing apparatus according to claim 1, wherein the image restoration processing portion performs the image restoration processing for the first region and the second region after the image replacing portion synthesizes the first image and the second image.

6. The image processing apparatus according to claim 1, wherein the image restoration processing portion performs the image restoration processing for whole regions of the first image and the second image.

7. The image processing apparatus according to claim 1, wherein the image restoration processing portion performs the image restoration processing only for the first region of the first image and the second region of the second image.

8. An image pickup apparatus comprising:
an image obtaining portion configured to obtain a first image and a second image that have exposures different from each other;
a region selecting portion configured to select a first region that is different from a region containing a luminance saturation part from the first image, and select a second region that corresponds to the region containing the luminance saturation part of the first image from the second image;
an image restoration processing portion configured to perform an image restoration processing so as to reduce an aberration by using an image restoration filter generated based on an optical transfer function for the first region of the first image and the second region of the second image; and
an image replacing portion configured to replace the region containing the luminance saturation part of the first image with the second region of the second image so as to synthesize the first region of the first image and the second region of the second image to generate one image,
wherein the image restoration filter is generated based on the optical transfer function of an image pickup optical system which is used for taking the first image and the second image.

9. An image processing method comprising the steps of:
obtaining a first image and a second image that have exposures different from each other;
selecting a first region that is different from a region containing a luminance saturation part from the first image, and selecting a second region that corresponds to the region containing the luminance saturation part of the first image from the second image;
performing an image restoration processing so as to reduce an aberration by using an image restoration filter generated based on an optical transfer function for the first region of the first image and the second region of the second image; and
replacing the region containing the luminance saturation part of the first image with the second region of the second image so as to synthesize the first region of the first image and the second region of the second image to generate one image,
wherein the image restoration filter is generated based on the optical transfer function of an image pickup optical system which is used for taking the first image and the second image.

10. A non-transitory recording medium storing a program for causing an information processing apparatus to execute an image processing method, the method comprising the steps of:
obtaining a first image and a second image that have exposures different from each other;
selecting a first region that is different from a region containing a luminance saturation part from the first image, and selecting a second region that corresponds to the region containing the luminance saturation part of the first image from the second image;
performing an image restoration processing so as to reduce an aberration by using an image restoration filter generated based on an optical transfer function for the first region of the first image and the second region of the second image; and
replacing the region containing the luminance saturation part of the first image with the second region of the second image so as to synthesize the first region of the first image and the second region of the second image to generate one image,
wherein the image restoration filter is generated based on the optical transfer function of an image pickup optical system which is used for taking the first image and the second image.

* * * * *